United States Patent [19]

Garner et al.

[11] 4,055,358

[45] Oct. 25, 1977

[54] NITRO-PHTHALIDES, THEIR MANUFACTURE AND THEIR USE IN RECORDING SYSTEMS

[75] Inventors: Robert Garner, Ramsbottom, England; Jean Claude Petitpierre, Kaiseraugst, Switzerland

[73] Assignee: Ciba-Geigy Corporation, Ardsley, N.Y.

[21] Appl. No.: 666,860

[22] Filed: Mar. 15, 1976

Related U.S. Application Data

[63] Continuation of Ser. No. 471,393, May 20, 1974, abandoned.

[30] Foreign Application Priority Data

May 21, 1973 United Kingdom ............... 24080/73

[51] Int. Cl.² .................... B41L 1/36; C07D 209/20
[52] U.S. Cl. .................... 282/27.5; 106/14.5; 260/326.14 R; 260/343.3 R; 428/307
[58] Field of Search .............. 260/343.3 R, 326.14 R; 106/14.5; 282/27.5; 428/307

[56] References Cited

U.S. PATENT DOCUMENTS

| | | | |
|---|---|---|---|
| 3,016,308 | 1/1962 | Macaulay ........................... | 106/14.5 |
| 3,594,369 | 7/1971 | Lin et al. ............................. | 104/14.5 |
| 3,703,397 | 11/1972 | Lin et al. ............................. | 106/14.5 |
| 3,829,322 | 8/1974 | Ozutsumi et al. ................. | 260/343.3 |
| 3,954,799 | 5/1976 | Borror ............................. | 260/343.3 X |

*Primary Examiner*—Ethel G. Love
*Attorney, Agent, or Firm*—Edward McC. Roberts; Prabodh I. Almaula

[57] ABSTRACT

Nitro-phthalides of the formula

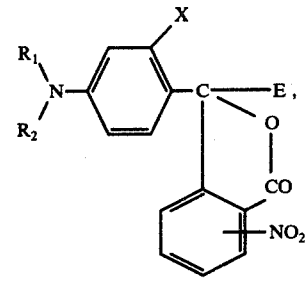

in which E is a radical of the formula

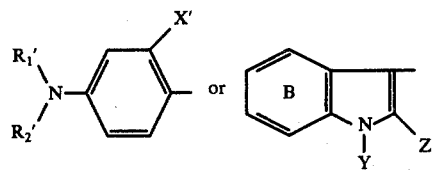

X and X' each represents alkyl with 1 to 12 carbon atoms, alkoxy with 1 to 12 carbon atoms or acyloxy with 2 to 12 carbon atoms, and X may also be hydrogen. Z represents hydrogen, alkyl having 1 to 12 carbon atoms or phenyl, Y represents hydrogen, alkyl having 1 to 12 carbon atoms, benzyl or cyanoethyl, $R_1$, $R_2$, $R_1'$ and $R_2'$, independently of the other, represents hydrogen, alkyl with 1 to 12 carbon atoms, alkoxyalkyl with 2 to 8 carbon atoms, cycloalkyl with 5 or 6 carbon atoms, benzyl or phenyl and the benzene ring B may be further substituted by halogen, nitro or an amino group optionally substituted by alkyl with 1 to 6 carbon atoms.

The nitro-phthalides are particularly useful as color formers which give intense green, blue-green or blue colors when they are brought into contact with an electron-accepting co-reactant.

17 Claims, No Drawings

NITRO-PHTHALIDES, THEIR MANUFACTURE AND THEIR USE IN RECORDING SYSTEMS

This is a continuation of application Ser. No. 471,393, filed on May 20, 1974, now abandoned.

The present invention relates to nitro-phthalides of the formula

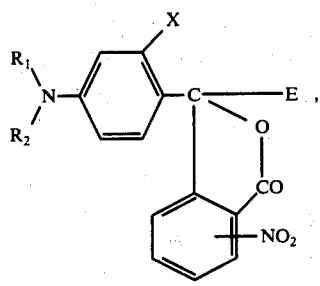

(1)

in which E is a radical of the formula

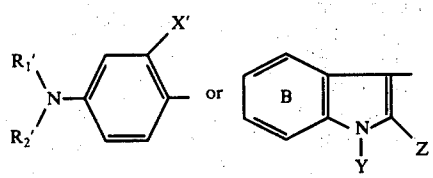

X and X' each represents alkyl with 1 to 12 carbon atoms, alkoxy with 1 to 12 carbon atoms or acyloxy with 2 to 12 carbon atoms, and X may also be hydrogen, Z represents hydrogen, alkyl having 1 to 12 carbon atoms or phenyl, Y represents hydrogen, alkyl having 1 to 12 carbon atoms, benzyl or cyanoethyl, $R_1$, $R_2$, $R_1'$ and $R_2'$, independently of the other, represent hydrogen, alkyl with 1 to 12 carbon atoms, alkoxyalkyl with 2 to 8 carbon atoms, cycloalkyl with 5 or 6 carbon atoms, benzyl or phenyl and the benzene ring B may be further substituted by halogen, nitro or an amino group optionally substituted by alkyl with 1 to 6 carbon atoms.

The radicals X and X', respectively, may represent alkyl such as methyl, ethyl, n-butyl, n-octyl or n-dodecyl; alkoxy such as methoxy, ethoxy, n-propoxy, n-butoxy, isopropoxy, n-tert. butoxy, n-octoxy or n-dodecoxy; acyloxy such as the radical of an alkane carboxylic acid with 2 to 12 carbon atoms, preferably an alkanoyloxy having 2 to 4 carbon atoms, e.g. acetoxy or propionyloxy.

Alkyl in Y and Z may be, for example methyl, ethyl, isopropyl, n-butyl, n-octyl or n-dodecyl.

The alkyl radicals occuring in the definitions of $R_1$, $R_1'$, $R_2$ and $R_2'$ are e.g. methyl, ethyl, isopropyl, n-butyl, n-octyl or n-dodecyl; cycloalkyl in these definitions may be, for example, cyclopentyl or cyclohexyl. Alkoxyalkyl in $R_1$, $R_2$, $R_1'$ and $R_2'$ may have 1 to 4 carbon atoms in each alkyl part and stands preferably for $\beta$-methoxyethyl or $\beta$-ethoxyethyl.

The indole ring may optionally be further substituted in positions 4, 5, 6 of 7 of the benzene ring B. Such substitutents e.g. may be chlorine, bromine, nitro, amino, isopropylamino, dimethylamino, diethylamino or n-hexylamino.

Halogen in each occurence in the definitions of the substituents preferably stands for fluorine or bromine or especially chlorine.

Suitable nitro-phthalides correspond to the formula

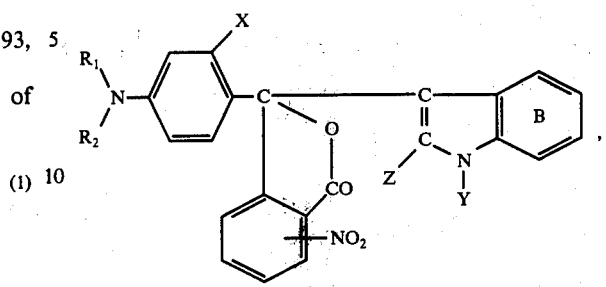

(2)

wherein $R_1$, $R_2$, X, Y, Z and B have the given meanings. Of special interest are nitro-phthalides of the formula

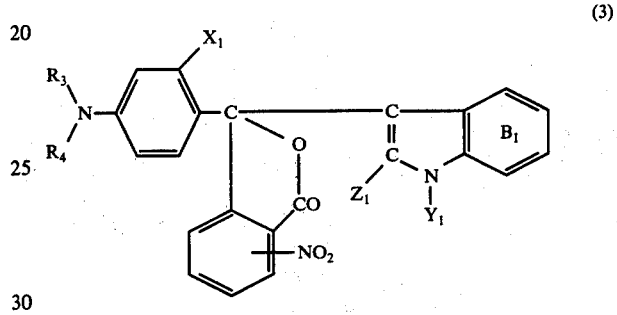

(3)

wherein $X_1$ represents alkyl with 1 to 4 carbon atoms, alkoxy with 1 to 12 carbon atoms or acyloxy with 2 to 12 carbon atoms, $Z_1$ represents hydrogen, alkyl with 1 to 4 carbon atoms or phenyl, $Y_1$ represents hydrogen, benzyl, or alkyl with 1 to 12 carbon atoms, $R_3$ and $R_4$ each represents hydrogen, alkyl with 1 to 12 carbon atoms or benzyl, and the benzene ring $B_1$ may be further substituted by chlorine, nitro, amino, mono- or dialkylamino with 1 to 4 carbon atoms in each alkyl part.

Preferred nitro-phthalides correspond to the formula

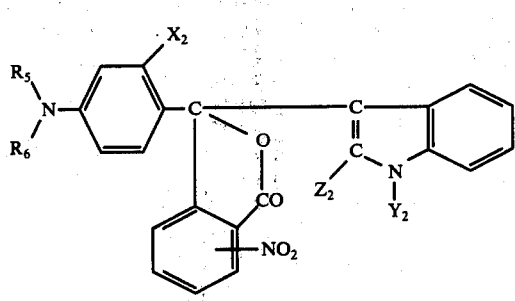

(4)

wherein $X_2$ represents hydrogen, methyl, alkoxy with 1 to 4 carbon atoms or alkanoyloxy having 2 to 4 carbon atoms, $Z_2$ is hydrogen, methyl, ethyl or phenyl, $Y_2$ is hydrogen or alkyl with 1 to 12 carbon atoms and $R_5$ and $R_6$, independently of the other, represent alkyl with 1 to 4 carbon atoms or benzyl.

Among the compounds of formula (4) the nitrophthalides of the formula

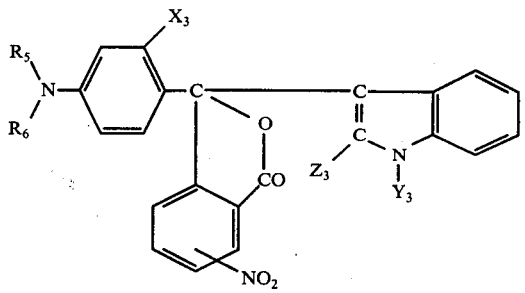

(5)

wherein $X_3$ is alkoxy with 1 to 4 carbon atoms, $Z_3$ is methyl, ethyl or phenyl, $Y_3$ is alkyl with 1 to 12 carbon atoms and $R_5$ and $R_6$ each is alkyl with 1 to 4 carbon atoms or benzyl are of very practical importance.

Particularly valuable nitrophthalides correspond to the formula

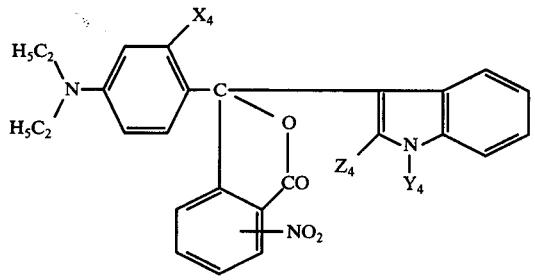

(6)

in which $X_4$ is ethoxy or propoxy, $Z_4$ is methyl or phenyl and $Y_4$ is alkyl with 1 to 8 carbon atoms.

The nitro group of the phthalic anhydride residue is in the 4-, 5-, 6- or 7-position and the nitro-phthalides may be present as mixtures of these isomers.

Preferred isomeric mixtures of nitro-phthalide compounds falling under the formulae 1 to 6 are the mixtures of two isomers, wherein the nitro groups of the phthalic anhydride residue are either in 4- and 7-positions or in 5- and 6-positions.

The nitrophthalides according to the invention are new and may be prepared by conventional methods known in the art. A process of manufacture nitro-phthalides of formula (1) comprises reacting one mole of a nitro-phthalic anhydride of the formula

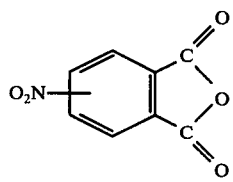

(7)

or an isomeric mixture thereof, with one mole of an indole of the formula

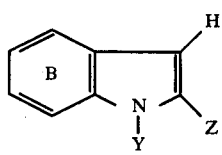

(8)

wherein Y, Z and B have the given meanings and one mole of an aminobenzene of the formula

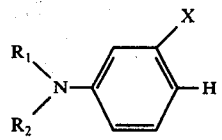

(9)

wherein $R_1$, $R_2$ and X have the given meanings, or one mole of a nitro-phthalic anhydride of formula (7) with one mole of each an aminobenzene of the formula (9) and the formula

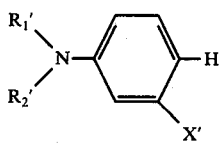

(10)

wherein $R_1'$, $R_2'$ and $X'$ have the given meangings.

The starting compound of formula (7) is preferably the 3- or 4-nitro-phthalic anhydride or a mixture of these two isomers.

Nitro-phthalides of formula (1), wherein E is an indole radical, are advantageously produced by first reacting a nitro-phthalic anhydride of formula (7) with an indole compound of formula (8) in an equimolar ratio and reacting the resulting mixture of the two isomeric 3-(2'-carboxynitro-benzoyl)-indoles with one mole of an aminobenzene of formula (9). The first step is preferably carried out in the presence of an organic solvent, for example, an alkylacetate such as ethylacetate, an aromatic hydrocarbon such as benzene, toluene or preferably xylene at temperatures ranging from 80° to 180° C. The resulting isomeric mixture is desirably reacted with the aminobenzene compound at temperatures of 50° to 120° C, preferably in an anhydric medium e.g. in acetic anhydride.

Nitro-phthalide compounds of formula (1), wherein E is an aminophenyl group, may be manufactured in two steps in so far as asymmetrical products are wanted. Symmetrical compounds are advantageously obtained in one step by reacting the nitro-phthalic anhydride and the aminobenzene of formula (9) in 1:2 mole ratio.

The nitro-phthalides according to the invention are more or less colourless compounds which are useful as so-called colour formers when they are brought into contact with an acidic active substance, that is an electron accepting substance.

Typical co-reactants are, for example, attapulgus clay, silton clay, silica, bentonite, halloysite, aluminium oxide, aluminium phosphate, kaolin or any acidic clay, or an acid reacting polymeric material such as a phenolic polymer, an alkylphenolacetylene resin, a maleic acid-rosin resin or a partially or wholly hydrolysed polymer of maleic anhydride with styrene, ethylene, vinyl methyl ether or carboxy polymethylenes.

The preferred co-reactants are attapulgus clay, silton clay or a phenol-formaldehyde resin. These electron acceptors, preferably, are coated on the front side of the receiving sheet.

With these colour formers a large variety of colours may be produced. When E is an aminophenyl radical the colour formers yield green or blue-green colours and they are also valuable in mixtures with other known colour formers when grey or black shades can be obtained. When E is an indolyl radical the colour formers yield dark blue colours and may be used singly to obtain dark blue prints previously obtainable from mixtures only. The dark shades obtainable with the present new colour formers are of great practical importance.

The present colour formers show an improved lightfastness, that is the use of nitro-phthalic anhydride leads to improved lightfastness compared with, when phthalic anhydride or tetrachloro phthalic anhydride are used as starting materials.

With the present nitro-phthalides a range of new colour formers is provided with solubilities such as to allow greater flexibility in choice of solvents used for encapsulations and other modes of applications.

As already mentioned, the new colour formers above all are suitable for the use in so-called pressure-sensitive recording material. Such a material e.g. includes at least one pair of sheets, which comprises at least a colour former of formula (1) or of the subordinate formulae, dissolved in an organic solvent, optionally contained in pressure rupturable microcapsules, and an electron accepting substance. The colour former, upon coming into contact with the electron accepting substance produces a coloured mark at the points where the pressure is applied.

These colour formers which are comprised in the pressure-sensitive copying material are prevented from becoming active by being separated from the electron accepting substance. As a rule this is done by incorporating these colour formers into a foam-, sponge- or honey-comb-like structure. Preferably however these colour formers are microencapsulated.

When these colourless colour formers of formula (1) are dissolved in an organic solvent, they may be subjected to a microencapsulation process and subsequently used for making pressure sensitive papers. When the capsules are ruptured by pressure from e.g. a pencil and the colour former solution is thus transferred onto an adjacent sheet coated with a substrate capable of acting as an electron acceptor, a coloured image is produced. This new colour results from the thus produced dyestuff which absorbs in the visible region of the electromagnetic spectrum.

The general art of making microcapsules of some chaacter has long been known. Well known methods e.g. are disclosed in U.S. Patent Nos. 2,183,053, 2,800,457, 2,800,458, 3,265,630, 2,964,331, 3,418,656, 3,418,250, 3,016,308, 3,424,827, 3,427,250, 3,405,071, 3,171,878 and 2,797,201. Further methods are disclosed in British Patent Specifications Nos. 989,264 and above all 1,156,725. Any of these and other methods are suitable for encapsulating the present colour formers.

Preferably the present colour formers are encapsulated as organic solutions thereof. Suitable solvents are preferably non-volatile e.g. polyhalogenated diphenyl such as trichlorodiphenyl and its mixture with liquid paraffin, tricresyl phosphate, di-n-butyl phthalate, dioctyl phthalate, trichlorobenzene, nitrobenzene, trichloroethyl phosphate, petroleum ether, hydrocarbon oils, such as paraffin, condensed derivatives of diphenyl or triphenyl, chlorinated or hydrogenated condensed aromatic hydrocarbons. The capsule walls preferably have been deposited by coacervation forces evenly around the droplets of the colour former solution, the encapsulating material consisting of gelatine, as e.g. described in U.S. Pat. No. 2,800,457.

Alternatively the capsules preferably may be made of aminoplast or modified aminoplasts by polycondensation as described in British Patent Specification Nos. 989,264 or 1,156,725.

A preferred arrangement is wherein the encapsulated colour former is coated on the back side of a transfer sheet and the electron accepting substance is coated on the front side of a receiving sheet.

In another preferred material one or more of the nitro-phthalides according to the invention are co-encapsulated with one or more other known colour formers such as crystal violet lactone, 3,3-bis(1'-n-octyl-2'-methylindol-3'-yl)phthalide or benzoyl leucomethylene blue.

The microcapsules containing the colour formers of formula (1) are used for making pressure-sensitive copying material of the various types known in the art, such as so called "Chemical Transfer" and "Chemical Self-contained" papers. The various systems mainly are distinguished by the arrangement of the capsules, the colour reactants are the support material.

The microcapsules may be in a undercoating of the upper sheet and the colour reactants, that is the electron acceptor and coupler, may be in the overcoating of the lower sheets. However, the components may also be used in the paper pulp. Such systems are called "Chemical Transfer"-system.

Another arrangement we have in the self-contained papers. There the microcapsules containing the colour former and the colour reactants are in or on the same sheet as one or more individual coatings or in the paper pulp.

Such pressure-sensitive copying materials are described e.g. in U.S. Patent Nos. 3,516,846, 2,730,457, 2,932,582, 3,427,180, 3,418,250 and 3,418,656. Further systems are disclosed in British Patent Specification Nos. 1,042,597, 1,042,598, 1,042,596, 1,042,599, 1,053,935 and 1,517,650. Microcapsules containing the colour formers of formula (1) are suitable for any of these and other systems.

The capsules are preferably fixed to the carrier by means of a suitable adhesive. Since paper is the preferred carrier material, these adhesives are predominantly paper coating agents, such as e.g. gum arabic, polyvinyl alcohol, hydroxymethylcellulose, casein, methylcellulose or dextrin.

In the present application, the definition "paper" not only includes normal papers from cellulose fibres, but also papers in which the cellulose fibres are replaced (partially or completely) by synthetic fibres of polymers.

The following non-limitative examples illustrate the present invention. Percentages are expressed by weight unless otherwise stated.

Preparation of 3-(2'-carboxy-nitro-benzoyl)indole isomeric mixtures

A. A mixture of 19,3 g 3-nitrophthalic anhydride, 13,1 g 2-methylindole and 60 ml toluene is heated for 3 hours at 100° C and cooled to 25° C. The precipitate thus obtained is filtered off, washed with toluene and methanol and dried in vacuo 80° C to yield 25,9 g (80% of theory) of the two isomers 3-(2'-carboxy-3'-nitro-benzoyl)-2-methyl indole and 3-(2'-carboxy-6'-nitro-benzoyl)-2-methyl indole, having a melting point of 199° – 202° C.

The following isometric mixtures of the formula (11) having the nitro groups in positions 3 and 6, relative to the CO-group, are prepared by a similar procedure as described under A), starting from 3-nitro-phthalic anhydride in toluene or xylene at temperatures between 100° and 140° C.

Table I

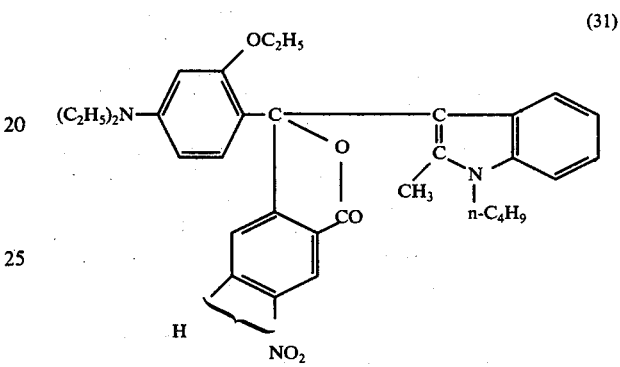

(11)

| Formula No. | $Y_5$ | $Z_5$ | positions of $NO_2$ | m.p. ° C |
|---|---|---|---|---|
| 12 | H | —⟨phenyl⟩ | 3 and 6 | 221 – 223 |
| 13 | $C_2H_5$ | $CH_3$ | 3 and 6 | 200 – 203 |
| 14 | $C_3H_7$ | $CH_3$ | 3 and 6 | 191 |
| 15 | $C_4H_9$ | $CH_3$ | 3 and 6 | 187 |
| 16 | $C_6H_{13}$ | $CH_3$ | 3 and 6 | 185 – 186 |
| 17 | $C_7H_{15}$ | $CH_3$ | 3 and 6 | 179 |
| 18 | $C_8H_{17}$ | $CH_3$ | 3 and 6 | 179 – 182 |

B. To a solution of 12.35 g of 1n-butyl-2-methylindole in 20 ml ethylacetate at 70° C, 11.6 g 4-nitrophthalic anhydride is added over 10 minutes. The reaction mixture is stirred under reflux at 80° C for C. hour and cooled to 20° C The crystalline solid thus obtained is filtered off, washed with a mixture of ethyl acetate and petroleum ether and dried in vacuo at 80° C to yield 19.6 g (86% of theory) of the two isomers 1-n-butyl-2-methyl-3-(2'-carboxy-4'-nitrobenzoyl) indole and 1-n-butyl-2-methyl-3-(2'-carboxy-5'-nitro-benzoyl)-indole having a melting point of 165°–167° C.

The isomers can be resolved by thin layer chromatography on silicagel when eluted with toluene-ethylacetatemethanol-acetic acid in a volume ratio of 7:1:1:1.

The following isomeric mixtures of the formula (21) having the nitro groups in positions 4 and 5, relative to the CO-group, , are prepared by a similar procedure as described under B), starting from 4-nitro-phthalic anhydride.

Table II (21)

| Formula No. | $Y_6$ | $Z_6$ | position of $NO_2$ | m.p. ° C |
|---|---|---|---|---|
| 22 | $C_2H_5$ | H | 4 and 5 | 221 – 224 |
| 23 | $C_2H_5$ | $CH_3$ | 4 and 5 | 205 – 206 |
| 24 | $C_3H_7$ | $CH_3$ | 4 and 5 | 184 – 186 |
| 25 | $C_5H_{11}$ | $CH_3$ | 4 and 5 | 161 – 162 |
| 26 | $C_6H_{13}$ | $CH_3$ | 4 and 5 | 153 – 154 |
| 27 | $C_7H_{15}$ | $CH_3$ | 4 and 5 | 157 – 158 |
| 28 | $C_8H_{17}$ | $CH_3$ | 4 and 5 | 150 – 151 |
| 29 | $C_5H_{11}$ | —⟨phenyl⟩ | 4 and 5 | 200 |

EXAMPLE 1

A mixture of 5.1 g of m-diethylamino-phenetole, 9.5 g of an isomeric mixture of 1-n-butyl-3-(2'-carboxy-4'-nitro-benzoyl)-2-methyl-indole and 1-n-butyl-3-(2'-carboxy-5'-nitro-benzoyl)-2-methylindole obtained under B), and 12.8 g of acetic anhydride is stirred for 2.5 hours at 80° C.

After adding 2 ml water the mixture is cooled to 20° C and then poured into 200 ml ice-water with vigourous stirring. The yellow solid which precipitates is filtered off, washed with dilute ammonia solution and dried in vacuo at 80° C to yield 13.6 g of a colour former isomeric mixture of the formula (31)

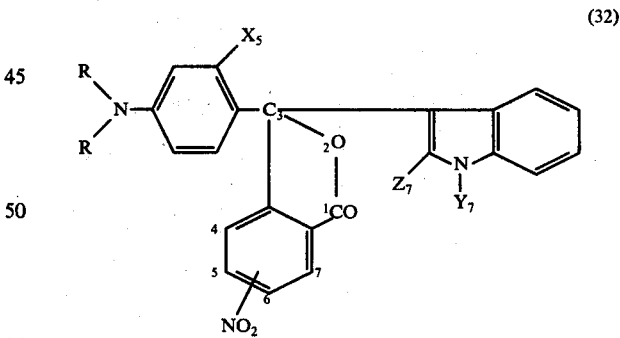

A solution of this isomeric mixture in 95% acetic acid shows λmax at 590 nm.

A solution of the above isomeric nitro-phthalide mixture in toluene gives an intense blue colouration when contacted with attapulgus clay, silton clay or a phenolic resin.

According to substantially the same procedure as described in Example 1 the following isomeric mixtures of nitro-phthalide compounds, having the nitro groups in positions 4 and 7 or 5 and 6 of the phthalic anhydride residue, of the formula (32)

given in Table III are obtained. In the seventh column of the Table the observed λmax in 95% acetic acid are quoted.

When brought into close contact with silton clay, the colour former mixtures of the formula (32) have the λmax indicated in the eighth column of Table III.

Table III

| Ex. | R | $X_5$ | $Z_7$ | $Y_7$ | position of $NO_2$ | λmax 95% acetic acid | λmax silton clay |
|---|---|---|---|---|---|---|---|
| 2 | $C_2H_5$ | $OC_2H_5$ | H | $C_2H_5$ | 5 and 6 | 574 nm | 580 nm |
| 3 | $C_2H_5$ | $OC_2H_5$ | $CH_3$ | $C_2H_5$ | 5 and 6 | 587 | 598 |
| 4 | $C_2H_5$ | $OC_2H_5$ | $CH_3$ | $n-C_3H_7$ | 5 and 6 | 588 | 594 |

Table III-continued

| Ex. | R | $X_5$ | $Z_7$ | $Y_7$ | position of $NO_2$ | $\lambda$max 95% acetic acid | $\lambda$max silton clay |
|---|---|---|---|---|---|---|---|
| 5 | $C_2H_5$ | $OC_2H_5$ | $CH_3$ | $n\text{-}C_5H_{11}$ | 5 and 6 | 589 | 595 |
| 6 | $C_2H_5$ | $OC_2H_5$ | $CH_3$ | $n\text{-}C_6H_{13}$ | 5 and 6 | 588 | 598 |
| 7 | $C_2H_5$ | $OC_2H_5$ | $CH_3$ | $n\text{-}C_7H_{15}$ | 5 and 6 | 590 | 593 |
| 8 | $C_2H_5$ | $OC_2H_5$ | $CH_3$ | $n\text{-}C_8H_{17}$ | 5 and 6 | 590 | 598 |
| 9 | $C_2H_5$ | $OC_2H_5$ |  | $n\text{-}C_5H_{11}$ | 5 and 6 | 588 | 590 |
| 10 | $C_2H_5$ | $OC_3H_7$ | $CH_3$ | $C_2H_5$ | 5 and 6 | 590 | 598 |
| 11 | $C_2H_5$ | $OCOCH_3$ | $CH_3$ | $C_2H_5$ | 5 and 6 | 615 | 606 |
| 12 | $C_4H_9$ | $OC_2H_5$ | $CH_3$ | $n\text{-}C_4H_9$ | 5 and 6 | 593 | 599 |
| 13 | $CH_2\text{-}\text{Ph}$ | $OC_2H_5$ | $CH_3$ | $n\text{-}C_3H_7$ | 5 and 6 | 593 | 598 |
| 14 | $C_2H_5$ | $OC_2H_5$ | $CH_3$ | $C_2H_5$ | 4 and 7 | 586 | 587 |
| 15 | $C_2H_5$ | $OC_2H_5$ | $CH_3$ | $n\text{-}C_7H_{15}$ | 4 and 7 | 584 | 585 |
| 16 | $C_2H_5$ | $OC_2H_5$ |  | H | 4 and 7 | 605 | 609 |
| 17 | $C_2H_5$ | $OC_2H_5$ | $CH_3$ | H | 4 and 7 | 577 | 570 |
| 18 | $C_2H_5$ | $OC_3H_7$ | $CH_3$ | $C_2H_5$ | 4 and 7 | 585 | 586 |
| 19 | $C_2H_5$ | $OC_3H_7$ | $CH_3$ | $n\text{-}C_4H_9$ | 4 and 7 | 583 | 585 |
| 20 | $C_2H_5$ | $CH_3$ | $CH_3$ | $C_2H_5$ | 4 and 7 | 610 | 609 |
| 21 | $C_2H_5$ | H | $CH_3$ | $C_2H_5$ | 4 and 7 | 600 | 601 |
| 22 | $C_2H_5$ | $OCOCH_3$ | $CH_3$ | $C_2H_5$ | 4 and 7 | 608 | 607 |

APPLICATION EXAMPLES

EXAMPLE 30

Preparation of Pressure-sensitive Copying Paper

A solution of 3 grams of the nitro-phthalide isomeric mixture according Example 3 of Table III in 97 g of hydrogenated terphenyl is emulsified in a solution of 12 g of pigskin gelatine in 88 g of water at 50° C, then a solution of 12 g gum arabic in 88 g of water at 50° C is added. The emulsion is diluted by adding 200 ml of water at 50° C and coacervation is brought about by pouring into 600 g of ice-water and stirring from 3 hours. The resulting suspension is coated on paper and dried. When this paper is placed with its coated side adjacent to a sheet of paper coated either with attapulgus clay, silton clay, silica, or phenolic resin and writing or typing is made upon the top sheet a strong blue copy is made upon the co-reactive sheet and the developed image has outstanding lightfastness.

Similar effects can be obtained by using any other colour former isomeric mixture of Table III.

EXAMPLE 31

Preparation of Pressure-sensitive Copying Paper

A solution of 2 grams of the nitro-phthalide isomeric mixture according to Example 3 of Table III and 1,5 g of benzoyl leuco methylene blue in 97 g or hydrogenated terphenyl is emulsified in a solution of 12 g of pigskin gelatine in 88 g of water at 50° C, then a solution of 12 g gum arabic in 88 g of water at 50° C is added. The emulsion is diluted by adding 200 ml of water at 50° C and coacervation is brought about by pouring into 600 g of ice-water and stirring for 3 hours. The resulting suspension is coated on paper and dried. When this paper is placed with its coated side adjacent to a sheet of paper coated either with attapulgus clay, silton clay, silica, or phenolic resin and writing or typing is made upon the top sheet a strong blue copy is made upon the co-reactive sheet and the developed image has outstanding lightfastness.

Similar effects can be obtained by using any other colour former isomeric mixture of Table III with benzoyl leuco methylene blue.

We claim:

1. A nitro-phthalide of the formula

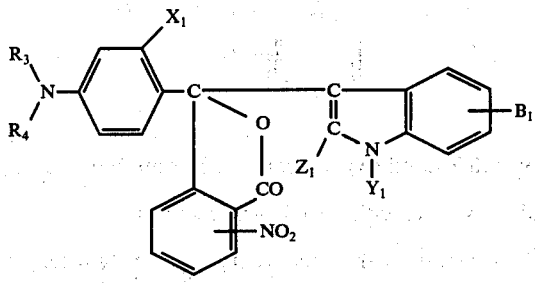

wherein $X_1$ represents alkyl with 1 to 4 carbon atoms, alkoxy with 1 to 12 carbon atoms or alkanoyloxy with 2 to 4 carbon atoms, $Z_1$ represents hydrogen, alkyl with 1 to 4 carbon atoms or phenyl, $Y_1$ represents hydrogen, benzyl or alkyl with 1 to 12 carbon atoms, $R_3$ and $R_4$ each represents hydrogen, alkyl with 1 to 12 carbon atoms or benzyl and $B_1$ represents hydrogen, chlorine, nitro, amino, mono- or dialkylamino with 1 to 4 carbon atoms in each alkyl part and mixtures of nitro isomers thereof.

2. A nitro-phthalide according to claim 1, wherein the nitro group of the phthalic anhydride residue is in the 4-, 5-, 6- or 7-position.

3. A nitro-phthalide according to claim 1, which is a mixture of two isomers, wherein the nitro groups of the phthalic anhydride residue are in 4- and 7-positions.

4. A nitro-phthalide according to claim 1, which is a mixture of two isomers, wherein the nitro groups of the phthalic anhydride residue are in 5- and 6-positions.

5. A nitro-phthalide according to claim 1, of the formula

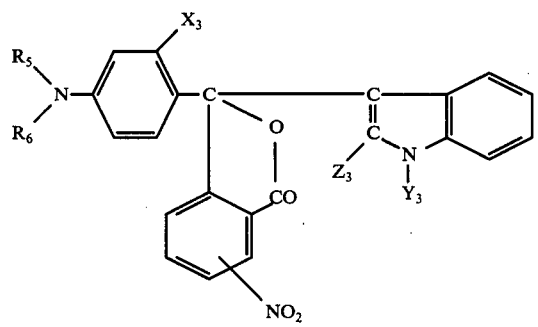

wherein X₃ is alkoxy with 1 to 4 carbon atoms, Z₃ is methyl, ethyl or phenyl, Y₃ is alkyl with 1 to 12 carbon atoms and R₅ and R₆ each is alkyl with 1 to 4 carbon atoms or benzyl.

6. A nitro-phthalide according to claim 5, of the formula

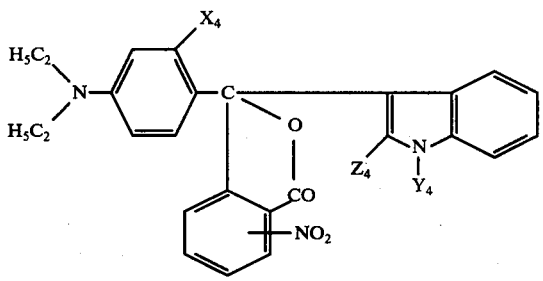

in which X₄ is ethoxy or propoxy, Z₄ is methyl or phenyl and Y₄ is alkyl with 1 to 8 carbon atoms.

7. A nitro-phthalide according to claim 1, which is a mixture of the two isomers defined by the formula

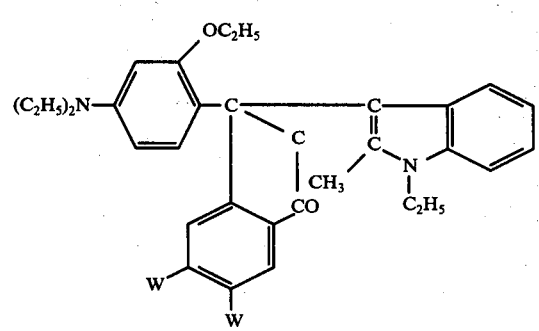

wherein one W is nitro and the other W is hydrogen.

8. A nitro-phthalide according to claim 1, which is a mixture of the two isomers defined by the formula

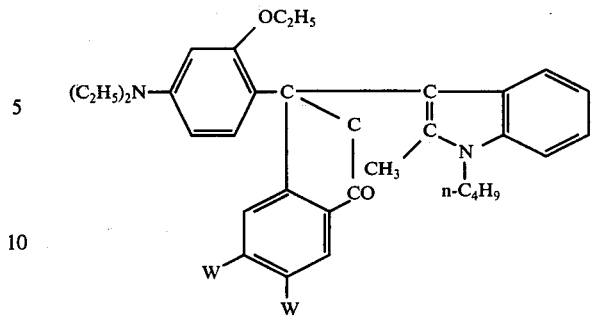

wherein one W is nitro and the other W is hydrogen.

9. A nitro-phthalide according to claim 1, which is a mixture of the two isomers defined by the formula

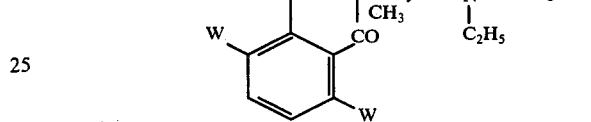

wherein one W is nitro and the other W is hydrogen.

10. A nitro-phthalide according to claim 1, which is a mixture of the two isomers defined by the formula

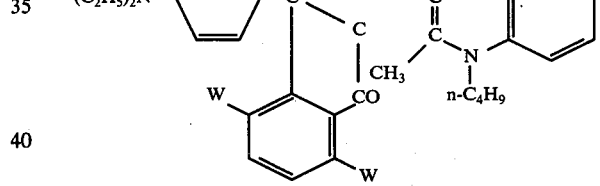

wherein one W is nitro and the other W is hydrogen.

11. Pressure-sensitive copying paper system containing included in its colour-reactant system a colour former as defined in claim 1.

12. A pressure-sensitive copying paper system according to claim 11, which comprises at least a colour former dissolved in an organic solvent and an electron accepting substance, said colour former upon coming into contact with the electron accepting substance being able to produce a coloured marking at the points where the pressure is applied.

13. A pressure-sensitive copying paper system according to claim 12, wherein the colour former dissolved in an organic solvent is contained in pressure-rupturable microcapsules.

14. A pressure-sensitive copying paper system according to claim 12, wherein the solid accepting substance is attapulgus clay, silton clay, silica or a phenyl-formaldehyde resin.

15. A pressure-sensitive copying paper system according to claim 12, wherein the encapsulated colour former is coated on the back side of a transfer sheet and the electron accepting substance is coated on the front side of a receiving sheet.

16. A pressure-sensitive copying paper system according to claim 11, wherein the colour former is co-encapsulated with one or more other colour formers.

17. A process for making copies with a pressure-sensitive copying paper containing microcapsules, and an electron acceptor, each capsule containing a colour former, wherein the colour former is a nitro-phthalide as defined in claim 1.

* * * * *

UNITED STATES PATENT AND TRADEMARK OFFICE
CERTIFICATE OF CORRECTION

PATENT NO. : 4,055,358
DATED : October 25, 1977
INVENTOR(S) : Robert Garner et al It is certified that error appears in the above-identified patent and that said Letters Patent are hereby corrected as shown below:

Column 12, claim 17, line 65, "paper containing" should read -- paper system containing --.

Signed and Sealed this

Eleventh Day of March 1980

[SEAL]

Attest:

*Attesting Officer*

SIDNEY A. DIAMOND

*Commissioner of Patents and Trademarks*